(12) United States Patent
Ito et al.

(10) Patent No.: US 11,722,897 B2
(45) Date of Patent: Aug. 8, 2023

(54) INTEGRITY PROTECTION FOR USER PLANE DATA IN 5G NETWORK

(71) Applicant: NEC Corporation, Tokyo (JP)

(72) Inventors: Hironori Ito, Tokyo (JP); Anand Raghawa Prasad, Tokyo (JP); Sivabalan Arumugam, Tamil Nadu (IN); Takahito Yoshizawa, Heidelberg (DE); Sivakamy Lakshminarayanan, Tamil Nadu (IN); Sheeba Backia Mary Baskaran, Tamil Nadu (IN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/540,455

(22) Filed: Dec. 2, 2021

(65) Prior Publication Data

US 2022/0095113 A1 Mar. 24, 2022

Related U.S. Application Data

(63) Continuation of application No. 16/969,363, filed as application No. PCT/JP2019/004247 on Feb. 6, 2019, now abandoned.

(30) Foreign Application Priority Data

Feb. 16, 2018 (IN) .............................. 201841005966

(51) Int. Cl.
*H04L 29/00* (2006.01)
*H04W 12/106* (2021.01)

(52) U.S. Cl.
CPC ................................ *H04W 12/106* (2021.01)

(58) Field of Classification Search
CPC ................................................... H04W 12/106
USPC ................................................................ 726/4
See application file for complete search history.

(56) References Cited

U.S. PATENT DOCUMENTS

| 8,832,449 B2 * | 9/2014 | Fischer | H04L 9/3242 |
| | | | 713/168 |
| 2002/0174332 A1 | 11/2002 | Vialen et al. | |
| 2008/0076359 A1 | 3/2008 | Charpentier et al. | |
| 2010/0293372 A1 | 11/2010 | Fischer et al. | |
| 2011/0188408 A1 | 8/2011 | Yi et al. | |

(Continued)

FOREIGN PATENT DOCUMENTS

| JP | 2008-515256 A | 5/2008 |
| JP | 2013-535147 A | 9/2013 |

(Continued)

OTHER PUBLICATIONS

International Search Report for PCT Application No. PCT/JP2019/004247, dated Apr. 23, 2019.

(Continued)

*Primary Examiner* — Brandon Hoffman
*Assistant Examiner* — Michael D Anderson
(74) *Attorney, Agent, or Firm* — Sughrue Mion, PLLC (57) ABSTRACT

A method for integrity protection scheme by a mobile communication device or a core network entity according to a first exemplary aspect of the present disclosure includes configuring settings and parameters for integrity protection for user data with another party; receiving user plane data from the other party, calculating Message Authentication Code for Integrity (MAC-I) for a part of the data and checking integrity of the part of the data.

12 Claims, 7 Drawing Sheets

(56) References Cited

U.S. PATENT DOCUMENTS

| | | | |
|---|---|---|---|
| 2013/0157621 A1* | 6/2013 | Muller | H04W 4/029 455/411 |
| 2014/0247786 A1 | 9/2014 | Izu et al. | |
| 2015/0296414 A1 | 10/2015 | Yi et al. | |
| 2017/0109521 A1 | 4/2017 | Ujiie et al. | |

FOREIGN PATENT DOCUMENTS

| | | |
|---|---|---|
| JP | 2019-527509 | 9/2019 |
| WO | 2013/072973 A1 | 5/2013 |
| WO | 2016/006150 A1 | 1/2016 |

OTHER PUBLICATIONS

Written opinion for PCT Application No. PCT/JP2019/004247, dated Apr. 23, 2019.

Extended European Search Report for EP Application No. EP19753900.0 dated Mar. 2, 2021.

ETSI TS136.323 V14.5.0, "LTE; Evolved Universal Terrestrial Radio Access (E-UTRA); Packet Data Convergence Protocol (PDCP) specification (3GPP TS 36.323 version 14.5.0 Release 14)", ETSI Technical Specification, Jan. 19, 2018, pp. 1-45.

U.S. Office Action for U.S. Appl. No. 16/969,363 dated Jan. 31, 2022.

Japanese Office Action for JP Application No. 2021-195867 dated Nov. 22, 2022 with English Translation.

Vodafone, "Execption for handling of time value unit 110 in GPRS Timer 3", 3GPP TSG CT WG1 #108, C1-180051, Jan. 22-26, 2018.

Ericsson, "Corrections to EASE", 3GPP TSG-SA WG3 #84, S3-161180, Jul. 25-29, 2016.

JP Office Action for JP Application No. 2021-195867, dated Feb. 14, 2023 with English Translation.

* cited by examiner

| D/C | R | R | R | R | R | PDCP SN | Oct 1
| PDCP SN (cont.) | Oct 2
| PDCP SN (cont.) | Oct 3
| Data | Oct 4

| MAC-I (optional) | Oct N-3
| MAC-I (cont.) (optional) | Oct N-2
| MAC-I (cont.) (optional) | Oct N-1
| MAC-I (cont.) (optional) | Oct N D/C: This field indicates whether the data is UP data (D) or CP data (C).

R: Reserved bit

PCDP SN: Sequence Number in PDCP

MAC-I: This field carries a message authentication code.

INTEGRITY PROTECTION FOR USER PLANE DATA IN 5G NETWORK

CROSS-REFERENCE TO RELATED APPLICATIONS

The present application is a continuation application of U.S. patent application Ser. No. 16/969,363 filed on Aug. 12, 2020, which is a National Stage Entry of international application PCT/JP2019/004247, filed Feb. 6, 2019, which claims the benefit of priority from Indian Patent Application 201841005966 filed on Feb. 16, 2018, the disclosures of all of which are incorporated in their entirety by reference herein.

TECHNICAL FIELD

This invention provides a new method on integrity protection of user plane data in 5G network, which resolves the problem with overload of processing the integrity protection. The method can reduce the processing load of the integrity protection and avoid service disruption.

BACKGROUND ART

In 5G network, integrity protection is applied to U-plane data for such as IoT applications, which is being discussed in 3GPP.

SUMMARY OF INVENTION

Technical Problem

When integrity protection is applied to the User Plane (UP) data transferred between UE and 5G network, if the data rate is high, UE cannot process the integrity protection check, or the processing could cause high power consumption and/or transmission delay, then the service cannot be sustained or the requirement of the service cannot be met. In 3GPP, the maximum data rate to support integrity protection is defined to avoid the problem, however, it's highly probable that some services in 5G require integrity protection with high data rate. Furthermore, no procedures are defined if the data rate exceeds the limitation.

Solution to Problem

A method for integrity protection scheme by a mobile communication device or a core network entity according to a first exemplary aspect of the present disclosure includes configuring settings and parameters for integrity protection for user data with another party; receiving user plane data from the other party, calculating Message Authentication Code for Integrity (MAC-I) for a part of the data and checking integrity of the part of the data.

A method for integrity protection scheme by a mobile communication device or a core network entity according to a second exemplary aspect of the present disclosure includes configuring settings and parameters on integrity protection with the other party, receiving the data from the other party; and deciding whether calculating MAC-I for the received data or not.

A method for integrity protection scheme by a mobile communication device or a core network entity according to a second exemplary aspect of the present disclosure includes configuring settings and parameters on integrity protection with the other party, calculating MAC-I for a part of data to be sent and sending the data and the MAC-I to the other party.

DESCRIPTION OF EMBODIMENTS

Embodiment 1

Figure 1:
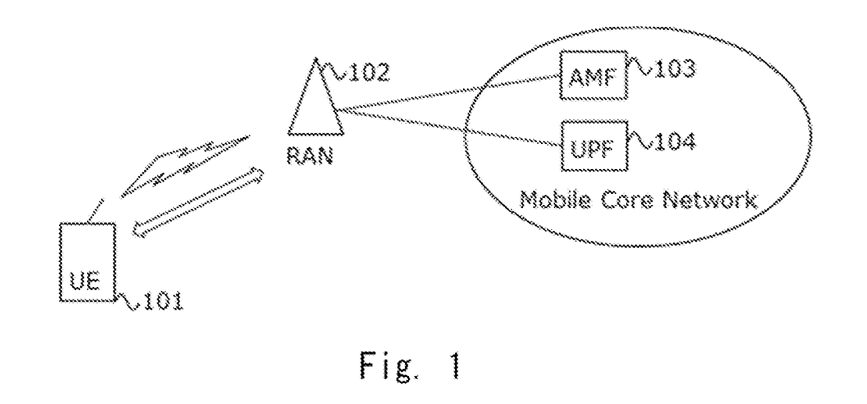
FIG. 1 shows the UE and mobile networks.

As shown in FIG. 1, a UE (User equipment)101 or a mobile terminal connects and communicates with 5G network including RAN (Radio Access Network)102 and core network nodes such as AMF (Access and Mobility management Function)103 and UPF (User Plane Function)104. In 5G networks, RAN (Radio Access network)102 is also called as NG (New Generation)-RAN or gNB (gNodeB), or other access networks such as Wi-Fi may be used as non-3GPP access. Integrity and confidentiality protection is usually applied to CP (Control Plane) data transferred between UE101 and RAN102 or between UE101 and AMF103, while the protection is optionally applied to UP (User Plane) data transferred between UE101 and RAN102 or between UE101 and UPF104. Configurations in terms of the integrity protection, such as usage of integrity protection, algorithms, security keys and any other settings on the integrity protection, are carried out when the UE101 connects to the 5G network.

Figure 2:
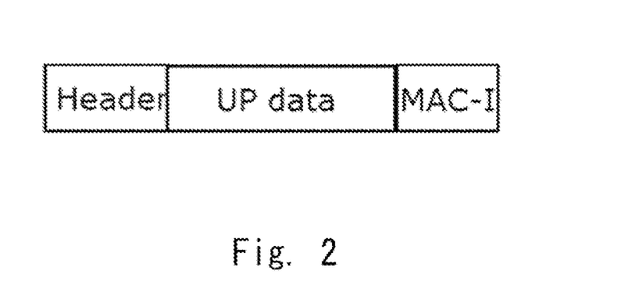
FIG. 2 shows U-plane data with MAC-I.

FIG. 2 shows the UP data with integrity protection which consists of header, UP data and MAC-I (Message Authentication Code for Integrity).

Figure 3:
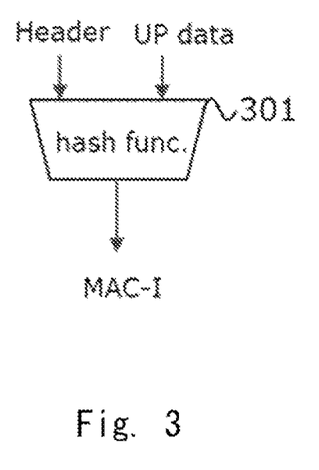
FIG. 3 shows Calculation of MAC-I.

The MAC-I is usually calculated by inputting header and UP data to hash function 301 as shown in FIG. 3. Some other values such as algorithm identifier of the integrity protection and parameters relating to the protection may be input to the hash function.

The UP data is sent from UE101 to network (RAN102 or UPF104) or vice versa.

Figure 4:
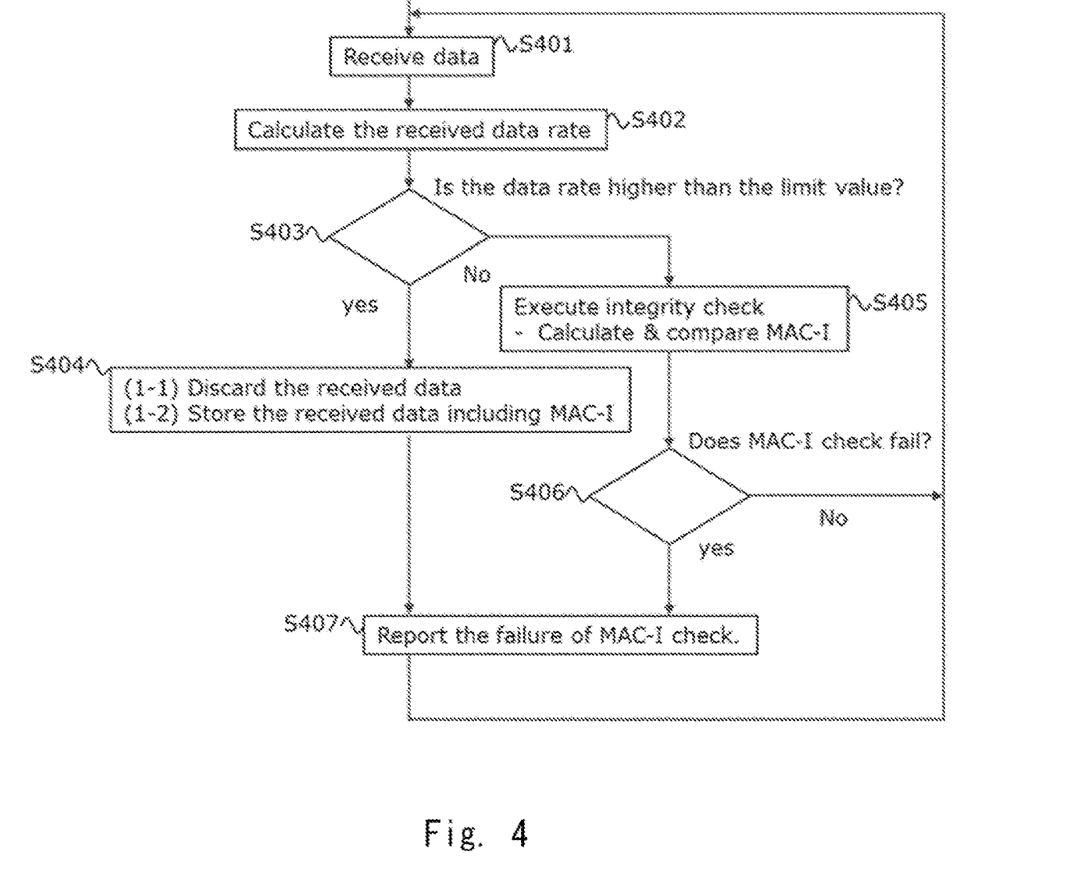
FIG. 4 shows a bock diagram of the method for embodiment 1.

FIG. 4 depicts a block diagram of the method to handle the received UP data at receiver side in this invention, and all the steps are executed in the receiver side. Firstly, the receiver (UE101, RAN102 or UPF104) receives UP data (S401). The data rate is calculated using the data including the ones received in the past, e.g., 1 second or 3, 5, 10 seconds, etc. (S402). It is checked whether the data rate is higher than the limit value which is preliminary configured, or not (S403). The data rate may be monitored in order to decide an action for the received data. The data rate may be provided by other layers such as physical layer of wireless transmission, or application layers. If the data rate is higher than the limit value, going to a step S404, otherwise S405. The data is discarded without executing the integrity check (S404, 1-1). Another option is that the data including MAC-I is stored (S404,1-2) so that the integrity check can be executed later, then going to a step S407. Integrity check is carried out (or executed) by calculating the MAC-I using header and UP data in the same manner as shown in FIG. 3, and comparing the MAC-I with the one in the received data (S405). If the result of the integrity check is fail, i.e., the values of both the MAC-Is don't match, going to a step S407, otherwise going back to the first step S401 (S406). The failure of the integrity is reported to the higher layer (S407). It may be reported that the check hasn't been done as in S404 or the result of the integrity check is fail in S405. The information may be sent to the sender side depending on the requirements of the application.

Embodiment 2

Figure 7:
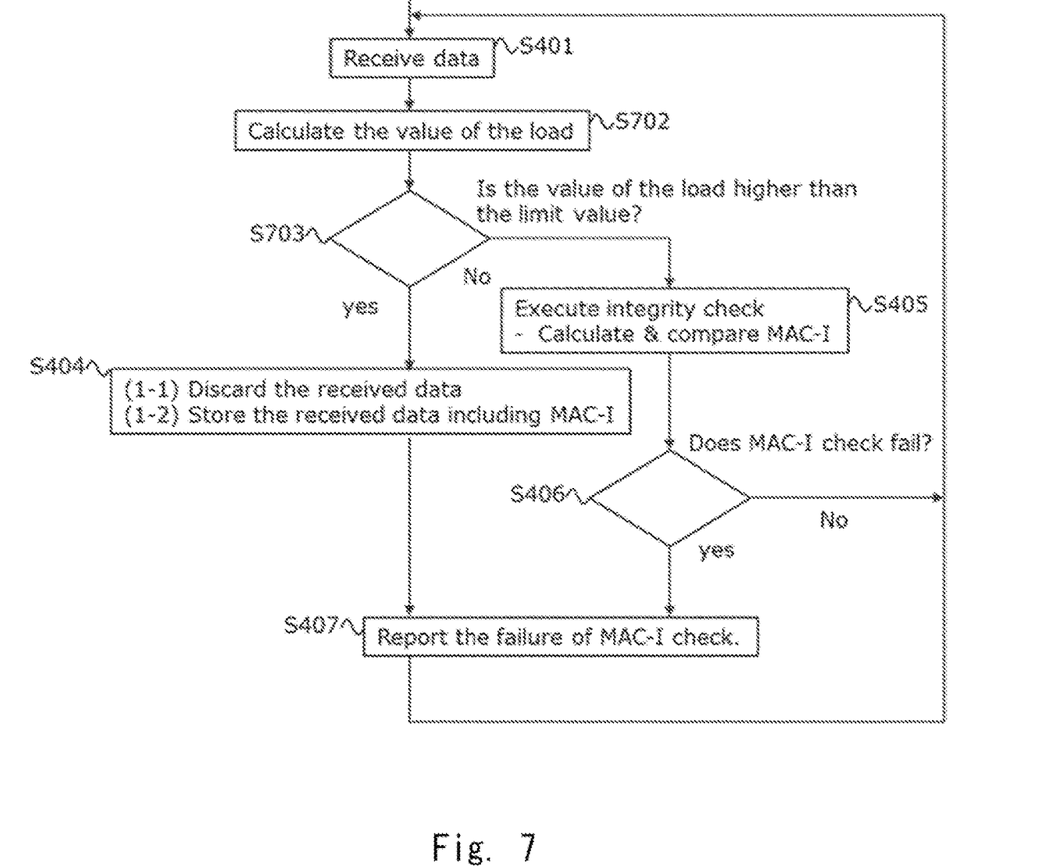
FIG. 7 shows a block diagram of the method for embodiment 2.

FIG. 7 depicts a block diagram of the method to handle the received UP data at receiver side in this invention. The difference from embodiment 1 is in only the steps S402 and S403 in the FIG. 4. The load of processors such as CPU (Central Processing Unit) or DSP (Digital Signal Processor) are monitored in order to decide the action for the received data. The load of processors are usually provided by the operation system. The value of the load is calculated, e.g., as the average in the past one or several seconds, corresponding to the reception of the UP data (S702). It is checked whether the value of the load is higher than the limit value which is preliminary configured, or not (S703). If it is higher, going to a step S404, otherwise S405.

Embodiment 3

Figure 8:
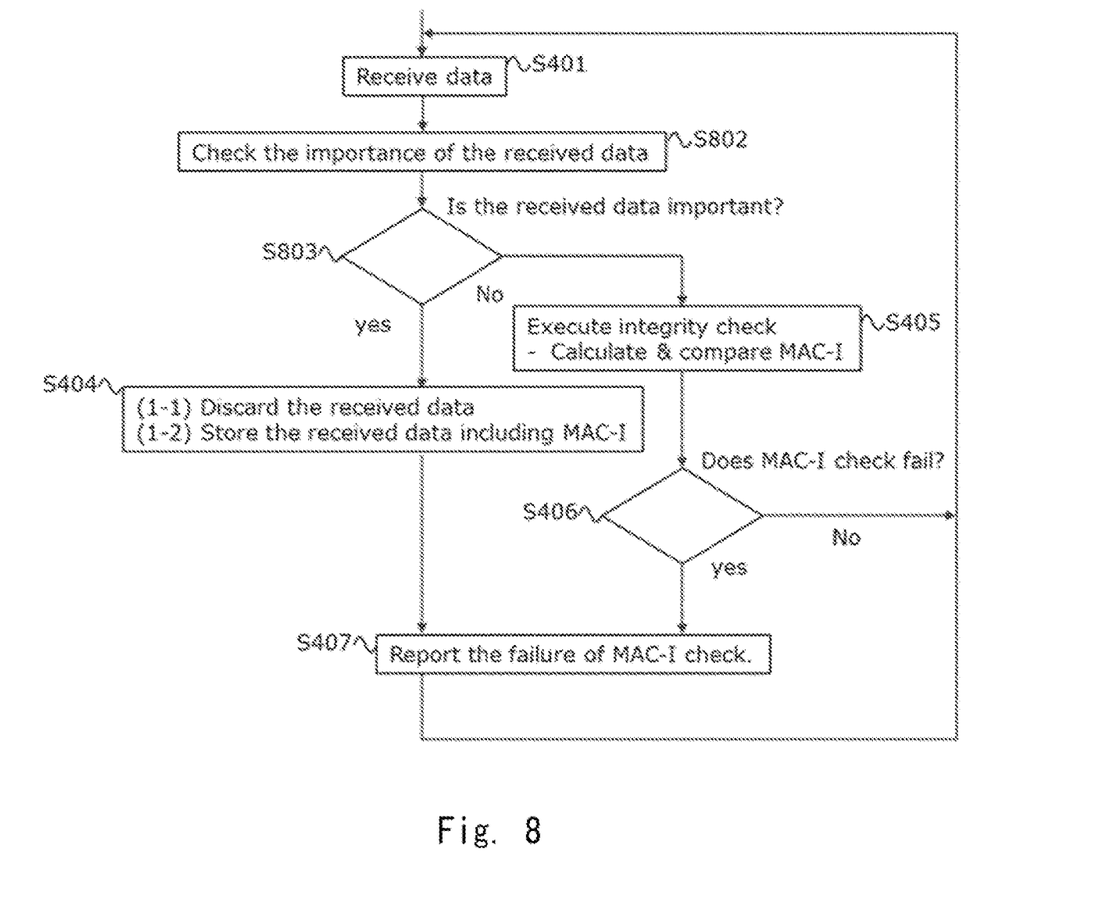
FIG. 8 shows a block diagram of the method for embodiment 3.

FIG. 8 depicts a block diagram of the method to handle the received UP data at receiver side in this invention. The difference from embodiment 1 is in only the steps S402 and S403 in the FIG. 4. The importance of the received data is checked (or monitored) in order to decide the action for the received data (S802). The importance means how the integrity protection is important for the data. For example, main information of the application or information which could cause serious damage if it is forged are important, while advertisement is less important. There are two options on the decision of the importance. One is that the importance is decided by the sender side, and the importance is marked in the header of the data. The information may be binary (important or not) or multiple levels. The receiver reads the information in the header, and decides the importance of the data. Another option is that the importance of the data is decided by the receiver side. If the data is important, going to a step S405 (integrity check is carried out), otherwise S404 (integrity check is not carried out) (S803).

Embodiment 4

Figure 5:
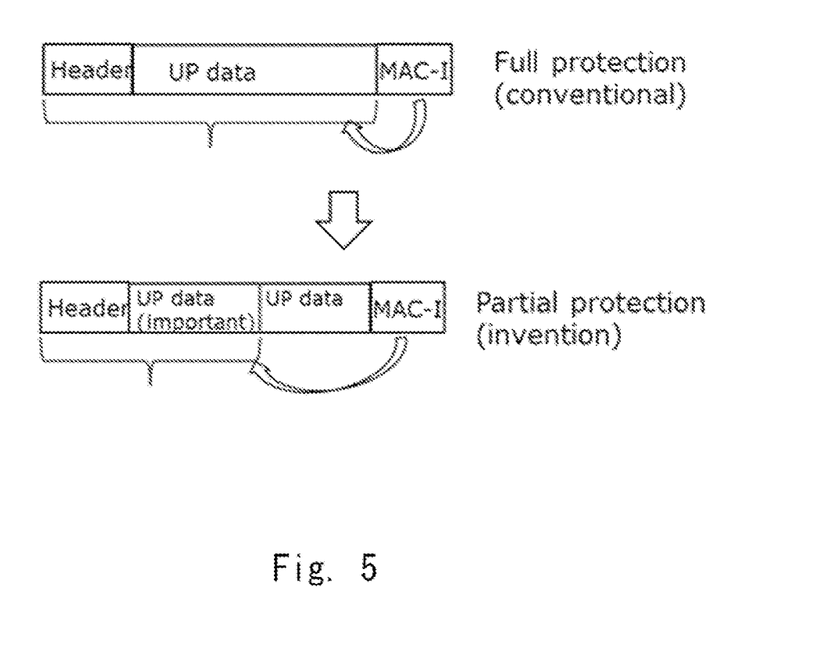
FIG. 5 shows a partial integrity protection.

An integrity for the part of the UP data, which has high importance, is checked in order to reduce a processing cost of the integrity check. When integrity for part of the data is appropriately protected, falsification of the data is impossible by modifying not protected data. Therefore, the processing cost can be reduced efficiently by checking the part of the UP data with maintaining the performance of integrity protection. When the UP data is audio data, integrity only for header and important part of the UP data with high sensitivity for audio quality such as the bits for high amplitude of the audio signals is protected. For video data, video header and intra frame or intra video packet, which are referred from ones for prediction are important, and the integrity for the data is protected. Such important data is usually gathered and placed from the beginning the UP data, then integrity protection for the part of the data is carried out, where MAC-I is calculated using header and important part of the UP data as shown in FIG. 5. There are two options to handle the size of the protected part of the UP data at both sender and receiver sides. One option is that the size is configured before starting the transferring the UP data as well as other settings. Another option is that the size is included in the header of the UP data by the sender, and the receiver reads the size from the header in the received data. This method can be combined with the embodiments 1 to 3 by replacing the step for calculating the MAC-I (S405) by the method as described here.

Embodiment 5

The size of MAC-I is decided appropriately depending on the importance of the data or the requirements of the applications in order to reduce the processing cost and overhead of the transferred data size, e.g., when the importance is higher, larger size of the MAC-I is selected. There are two options to handle the size of the MAC-I at both sender and receiver sides. One option is that the size is configured before starting the transferring the UP data as well as other settings. Another option is that the size is included in the header of the UP data by the sender, and the receiver reads the size from the header in the received data. This method can be combined with the embodiments 1 to 3 by replacing the step for calculating the MAC-I (S405) by the method as described here.

Embodiment 6

Figure 6:
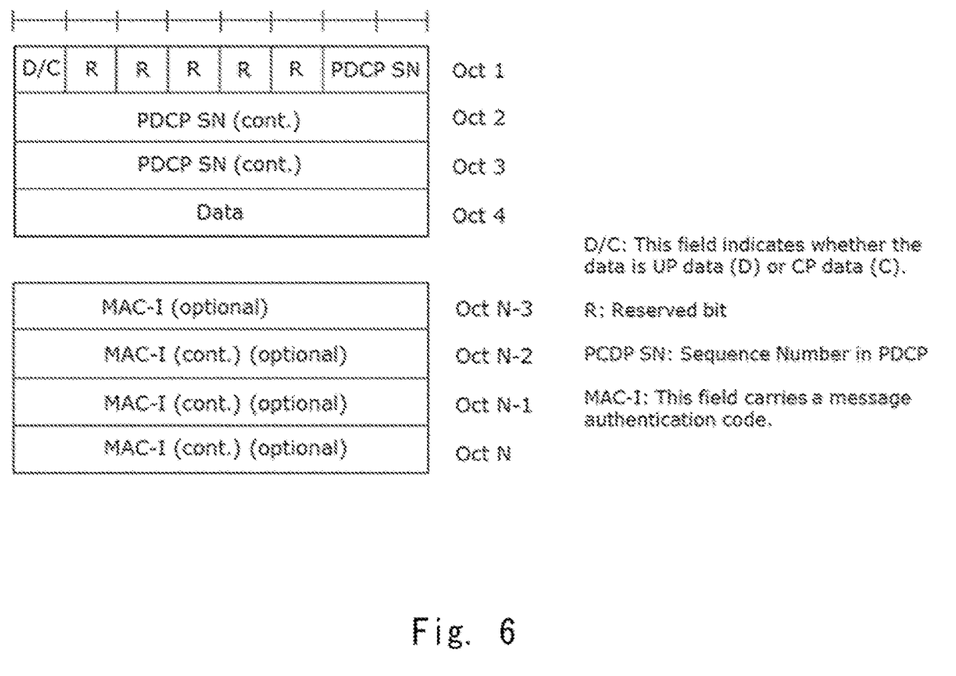
FIG. 6 shows a data format in PDCP.

The methods described in embodiment 3 to 5 are realized with PDCP (Packet Data Convergence Protocol) defined in 3GPP TS 33.323 v15.0.0. FIG. 6 shows the format used with PDCP, where reserved bits (R) are shown, which can be used to combine with the methods in the invention.

For the method described in embodiment 3, the importance of the data is shown using the reserved bits as follows:
R: important (1), not important (0)
Further, multiple bits of R are used to show the multiple levels of the importance. For example, when there are four levels of the importance, two bits of R are used as follows:
RR: lowest level (00), level 1 (01), level 2 (10), highest level (11)

In the same way, the size of the protected data described in embodiment 4 is shown using the reserved bits. The bits may show the size directly, or the index of the table which defines the size. For example, three bits of R is used to show the index of the table with 8 patterns of the sizes as follows:
Size_table[8]={0, 16, 32, 128, 256, 512, 1024, all}
RRR(001) shows that 16 bytes of UP data from the beginning are protected. The size may include the header size. RRR (000) shows no protection, RRR(111) shows all the data is protected.

Embodiment 7

How settings and parameters for integrity protection in this invention, such as methods of integrity protection, the number of protected bits and etc., shown in the previous embodiments, are configured in the UE and 5G network node (such as gNB) is described. When the UE connects to the 5G network, registration procedure or handover procedure as defined in 5G specifications are carried out in 5G network during which the UE sends the settings or parameters on integrity protection as well as other information on UE's capabilities to the network. At network side, the settings or parameters are decided based on the information sent from the UE, security policy of network operators, requirements of the applications or services provided to the UE. The decided settings and parameters are sent to the UE with integrity and confidentiality protection. These settings and parameters (both ones received from UE and currently used) are also transferred from source network node to target network node during handover with integrity and confidentiality protection. During registration or handover, the network node check whether the current settings and parameters are sufficient, and change the current ones depending on the requirements, or reject the UE's access if the UE doesn't have the required capabilities.

Our disclosure includes:

(1) Configuring settings and parameters for integrity protection for user data in this invention, such as methods of integrity protection, the number of protected bits and etc., before starting a communication between a mobile terminal and a network, e.g., the configurations include at least one limitation data rate/processing load, handling of important data, or protected data size, etc.

(2) During the communication, data rate/processing load or importance of the user plane data are monitored to decide the action for the received data.

(3) Based on the decision, integrity check is carried out (execute), or the user plane data is discarded or stored without integrity check.

Our disclosure includes:
Method for partial integrity check
Comprising the steps of (1) Configuring a method of integrity protection for part of user data and the number of protected bits before starting a communication between a mobile terminal and a network, (2) An integrity for the part of the UP data is checked by calculating the MAC-I for the data of the configured size at sender and receiver.

This application is based upon and claims the benefit of priority from Indian patent applications No. 201841005966, filed on Feb. 16, 2018, the disclosure of which is incorporated herein in its entirety by reference.

REFERENCE SIGNS LIST

101 UE
102 RAN
103 AMF
104 UPF

The invention claimed is:

1. A method of a User Equipment (UE), the method comprising:
 sending, to a Radio Access Node (RAN) node, first integrity algorithm information in UE security capability information for User Plane (UP) integrity protection during a registration procedure;
 receiving, from the RAN node, second integrity algorithm information for the UP integrity protection based on a decision of the RAN node; and
 executing the UP integrity protection of data between the UE and the RAN node using a Message Authentication Code for Integrity (MAC-I) based on the second integrity algorithm information.

2. The method according to claim 1, wherein the RAN node decides whether to send the second integrity algorithm information to the UE or not.

3. The method according to claim 1, wherein the RAN node is a New Generation (NG)-RAN or a gNodeB (gNB).

4. A method of a Radio Access Node (RAN) node, the method comprising:
 receiving, from a User Equipment (UE), first integrity algorithm information in UE security capability information for User Plane (UP) integrity protection during a registration procedure;
 sending, to the UE, second integrity algorithm information for the UP integrity protection based on a decision of the RAN node; and
 executing the UP integrity protection of data between the UE and the RAN node using a Message Authentication Code for Integrity (MAC-I) based on the second integrity algorithm information.

5. The method according to claim 4, further comprising: deciding whether to send the second integrity algorithm information to the UE or not.

6. The method according to claim 4, wherein the RAN node is a New Generation (NG)-RAN or a gNodeB (gNB).

7. A User Equipment (UE), comprising:
 a memory configured to store instructions; and
 a processor configured to execute the instructions to:
 send, to a Radio Access Node (RAN) node, first integrity algorithm information in UE security capability information for User Plane (UP) integrity protection during a registration procedure,
 receive, from the RAN node, second integrity algorithm information for the UP integrity protection based on a decision of the RAN node, and
 execute the UP integrity protection of data between the UE and the RAN node using a Message Authentication Code for Integrity (MAC-I) based on the second integrity algorithm information.

8. The UE according to claim 7, wherein the RAN decides whether to send the second integrity algorithm information to the UE or not.

9. The UE according to claim 7, wherein the RAN node is a New Generation (NG)-RAN or a gNodeB (gNB).

10. A Radio Access Node (RAN) node, comprising:
 a memory configured to store instructions; and
 a processor configured to execute the instructions to:
 receive, from a User Equipment (UE), first integrity algorithm information in UE security capability information for User Plane (UP) integrity protection during a registration procedure,
 send, to the UE, second integrity algorithm information for the UP integrity protection based on a decision of the RAN node, and
 execute the UP integrity protection of data between the UE and the RAN node using a Message Authentication Code for Integrity (MAC-I) based on the second integrity algorithm information.

11. The RAN node according to claim 10, wherein the processor further configured to execute the instructions to: decide whether to send the second integrity algorithm information to the UE or not.

12. The RAN node according to claim 10, wherein the RAN node is a New Generation (NG)-RAN or a gNodeB (gNB).

* * * * *